US008874485B2

(12) United States Patent
Partridge et al.

(10) Patent No.: US 8,874,485 B2
(45) Date of Patent: Oct. 28, 2014

(54) PRIVACY-PRESERVING BEHAVIOR TARGETING FOR DIGITAL COUPONS (75) Inventors: Kurt Partridge, Palo Alto, CA (US); Ersin Uzun, Mountain View, CA (US); Cong Wang, Chicago, IL (US); Manas Ashok Pathak, Pittsburgh, PA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 153 days.

(21) Appl. No.: 13/329,020

(22) Filed: Dec. 16, 2011

(65) Prior Publication Data
US 2013/0159192 A1 Jun. 20, 2013

(51) Int. Cl.
G06F 21/00 (2013.01)
G06Q 30/00 (2012.01)

(52) U.S. Cl.
USPC ............................................. 705/52; 705/26.1

(58) Field of Classification Search
USPC ........................... 705/53, 59; 463/29; 235/492
See application file for complete search history.

(56) References Cited

U.S. PATENT DOCUMENTS

| | | | | |
|---|---|---|---|---|
| 6,832,207 B1 * | 12/2004 | Shkedi | ................... | 705/14.73 |
| 7,051,041 B1 * | 5/2006 | Miller | ................... | 1/1 |
| 7,089,554 B2 * | 8/2006 | Shiomi et al. | ................... | 718/1 |
| 7,089,594 B2 * | 8/2006 | Lal et al. | ................... | 726/31 |
| 7,099,834 B2 * | 8/2006 | Dutta et al. | ................... | 705/27.1 |
| 7,158,977 B2 * | 1/2007 | Challener et al. | ................... | 1/1 |
| 7,204,421 B2 * | 4/2007 | Austin | ................... | 235/462.01 |
| 7,225,399 B2 * | 5/2007 | Watson | ................... | 715/210 |
| 7,243,099 B2 * | 7/2007 | Lokken | ................... | 1/1 |
| 7,266,506 B2 * | 9/2007 | Thomas et al. | ................... | 705/346 |
| 7,289,983 B2 * | 10/2007 | Best et al. | ................... | 1/1 |
| 7,299,195 B1 * | 11/2007 | Tawakol et al. | ................... | 705/14.71 |
| 7,320,005 B2 * | 1/2008 | Li et al. | ................... | 1/1 |
| 7,472,082 B2 * | 12/2008 | Wirth, Jr. | ................... | 705/26.8 |
| 7,499,888 B1 * | 3/2009 | Tu et al. | ................... | 705/44 |
| 7,519,200 B2 * | 4/2009 | Gokturk et al. | ................... | 382/118 |
| 7,526,494 B2 * | 4/2009 | Rom et al. | ................... | 1/1 |
| 7,542,610 B2 * | 6/2009 | Gokturk et al. | ................... | 382/209 |
| 7,555,257 B2 * | 6/2009 | Grossman et al. | ................... | 455/3.01 |
| 7,567,799 B2 * | 7/2009 | Grossman et al. | ................... | 455/414.1 |

(Continued)

OTHER PUBLICATIONS

S. Guha et al., "Privad: practical privacy in online advertising", in Proc. of NSDI, 2011.
M. Charikar, "Similarity estimation techniques from rounding algorithms", in Proc. of the 34th Annual ACM Symposium on Theory of Computing, 2002.
V. Toubiana et al. "Adnostic: Privacy preserving targeted advertising", in Proc. of NDSS, 2010.

(Continued)

*Primary Examiner* — Evens J Augustin
(74) *Attorney, Agent, or Firm* — Shun Yao; Park, Vaughan, Fleming & Dowler LLP (57) ABSTRACT

A smart coupon-delivery system provides targeted coupons to a user using a criteria-encoded message received from a coupon server. The criteria-encoded message is generated by the coupon server from a behavior-criteria vector that indicates criteria for selecting a recipient of a digital coupon. The system then generates a user-behavior vector to indicate one or more behavior patterns of an end-user, and encodes the user-behavior vector to produce a behavior-encoded message. The system then determines whether the end-user is eligible to receive the digital coupon based on the criteria-encoded message and the behavior-encoded message. If the system determines that the end-user is eligible, the system presents the digital coupon to the end-user.

24 Claims, 8 Drawing Sheets

(56) References Cited

U.S. PATENT DOCUMENTS

| | | | |
|---|---|---|---|
| 7,577,974 B2* | 8/2009 | Grossman et al. | 725/62 |
| 7,584,223 B1* | 9/2009 | Pinkas et al. | 1/1 |
| 7,587,446 B1* | 9/2009 | Onyon et al. | 709/203 |
| 7,590,562 B2* | 9/2009 | Stoppelman | 705/26.7 |
| 7,599,861 B2* | 10/2009 | Peterson | 705/26.7 |
| 7,613,626 B1* | 11/2009 | Muniganti et al. | 705/7.35 |
| 7,613,729 B2* | 11/2009 | Nuno et al. | 1/1 |
| 7,617,154 B1* | 11/2009 | Melling et al. | 705/40 |
| 7,620,667 B2* | 11/2009 | Rollin et al. | 1/1 |
| 7,634,509 B2* | 12/2009 | Onyon et al. | 1/1 |
| 7,636,324 B2* | 12/2009 | Nassar | 370/254 |
| 7,640,167 B2* | 12/2009 | Ookushi | 705/1.1 |
| 7,640,198 B1* | 12/2009 | Albanese et al. | 705/35 |
| 7,643,824 B2* | 1/2010 | Onyon et al. | 455/419 |
| 7,647,305 B2* | 1/2010 | Gorodyansky | 707/999.003 |
| 7,647,325 B2* | 1/2010 | Papatla et al. | 707/999.01 |
| 7,657,100 B2* | 2/2010 | Gokturk et al. | 382/209 |
| 7,657,126 B2* | 2/2010 | Gokturk et al. | 382/305 |
| 7,660,468 B2* | 2/2010 | Gokturk et al. | 382/224 |
| 7,660,753 B2* | 2/2010 | Sakuma et al. | 705/28 |
| 7,680,686 B2* | 3/2010 | Tellefsen et al. | 705/7.31 |
| 7,685,022 B1* | 3/2010 | Heyworth et al. | 705/26.8 |
| 7,698,165 B1* | 4/2010 | Tawakol et al. | 705/14.4 |
| 7,707,075 B2* | 4/2010 | Vaughan et al. | 705/28 |
| 8,315,909 B1* | 11/2012 | Barker | 705/16 |
| 2003/0028451 A1* | 2/2003 | Ananian | 705/27 |

OTHER PUBLICATIONS

M. Fredrikson et al., "Repriv: Re-envisioning in-browser privacy", in Proc. of IEEE Symposium on Security and Privacy, 2011.

Alexandr Andoni et al., "Near-optimal hashing algorithms for approximate nearest neighbor in high dimensions", Communications of the ACM, 51:117-112, 2008.

Mihir Bellare et al., "Authenticated key exchange secure against dictionary attacks", in Proc. of Eurocrypt, pp. 139-155, 2000.

Mikhail Bilenko et al., "Predictive client-side profiles for personalized advertising", in Proc. of ACM SIGKDD, 2011.

M. Datar et al., "Locality-sensitive hashing scheme based on p-stable distributions", In. Proc of STOC, pp. 253-262, 2004.

Yabo Xu et al., "Privacy-enhancing personalized web search", in Proc. of the 16th International World Wide Web Conference, 2007.

Kurt Partridge et al., "Activity-based advertising" in Pervasive Advertising, Springer-Verlag, London, UK, 2011.

Torben P. Pedersen "Non-interactive and information-theoretic secure verifiable secret sharing", In Proc. of CRYPTO, vol. 576 of LNCS, pp. 129-140, 1991.

Kazunari Sugiyama, et al., "Adaptive web search based on user profile constructed without any effort from users" In Proc. of WWW, 2004.

J. Turow et al., "Americans reject tailored advertising and three activities that enable it", Departmental Papers (ASC), p. 137, 2009.

* cited by examiner

PRIVACY-PRESERVING BEHAVIOR TARGETING FOR DIGITAL COUPONS

BACKGROUND

1. Field

This disclosure is generally related to delivering targeted coupons. More specifically, this disclosure is related to determining whether an end-user is eligible to receive a digital coupon without revealing sensitive information about the end-user or the vendor's targeting strategy.

2. Related Art

Advancements in mobile computing have made it possible for people to increase their level of interaction with their mobile devices. These mobile devices can connect to the Internet, they can obtain detailed information about the user (e.g., location information, user profile information, social-networking information, etc.), and they can include a high-resolution display for presenting rich content to the user. Further, applications installed in these mobile devices can use this detailed information about the user to provide specific services to the user. Many of these applications can be installed for free, and may periodically display a coupon as a source of revenue.

However, many users have developed an acute sense of which advertisements or coupons are relevant to their interests, and are likely to ignore coupons that are not relevant to their lifestyle. Further, vendors are often more interested in offering coupons to users that are likely to become loyal routine customers. Therefore, a vendor can provide coupons that are directed to certain users based on behavior information about the user. For example, some businesses may desire to provide a digital coupon to users that have performed a certain action (e.g., recently visited a competitor's Web page). However, to determine whether the user has performed the desired actions, these advertising networks need to obtain personal user information from the user's personal computing device, and not all users feel comfortable releasing their personal behavior information.

Further, users oftentimes limit the information that an advertising network can obtain about them, which can prevent the advertising network from selecting the most-relevant coupons for these users. To appease the privacy-sensitive end-users, some advertising networks promote a privacy-preserving advertisement targeting system that analyzes a user's personal information at his personal computing device. These targeting systems select a targeted advertisement from a group of candidate advertisements, without releasing the selection results to the advertisement server. Unfortunately, performing the targeting algorithm on the user's computing device can reveal the advertiser's trade secrets. These advertising systems cannot be used to provide targeted coupons because it is possible for a user to access the targeting criteria, and to generate fake user information in order to obtain the desired coupon.

SUMMARY

One embodiment provides a coupon-delivery system that provides targeted coupons to a user. The system receives a criteria-encoded message from a coupon server, such that the criteria-encoded message is generated from a behavior-criteria vector that indicates criteria for selecting a recipient of a digital coupon. The system then generates a user-behavior vector to indicate one or more behavior patterns of an end-user, and encodes the user-behavior vector to produce a behavior-encoded message. The system determines whether the end-user is eligible to receive the digital coupon based on the criteria-encoded message and the behavior-encoded message. Thus, if the system determines that the end-user is eligible, the system presents the digital coupon to the end-user.

In some embodiments, the criteria-encoded message is generated by encoding the behavior-criteria vector using a locality-sensitive hash function. Further, the system can produce the behavior-encoded message by encoding the user-behavior vector using the locality-sensitive hash function.

In some variations, the system determining whether the end-user is eligible to receive the digital coupon by comparing the behavior-encoded message to the criteria-encoded message.

In some embodiments, the criteria-encoded message encrypts a first secret using a criteria-encoded key from the coupon server, such that the criteria-encoded key is generated from the behavior-criteria vector. Further, the system produces the behavior-encoded message by first generating a behavior-encoded key from the user-behavior vector. Then, the system generates a second secret and encrypts the second secret using the behavior-encoded key as the encryption key to produce the behavior-encoded message.

In some variations, the system sends the behavior-encoded message, which encrypts the second secret, to the coupon server.

In some variations, the system decrypts the first secret from the criteria-encoded message by using the behavior-encoded key as the decryption key.

In some variations, the system receives an encrypted digital coupon from the coupon server, and determines whether the end-user is eligible to receive the digital coupon by generating a shared key from the first and second secrets, and determining whether the shared key decrypts the encrypted digital coupon.

In some embodiments, the behavior-criteria vector includes one or more numeric entries indicating a behavior criteria. Further, the system stores, for each entry of the behavior-criteria vector, a behavior-detecting function that encodes a behavior pattern of the end-user. Then, while generating the user-behavior vector, the system can generate a numeric value for an entry of the user-behavior vector using a corresponding behavior-detecting function.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of securely determining whether a user is eligible to receive a digital coupon by providing a smart coupon delivery system that compares encoded versions of a user's behavior pattern to a vendor's user-behavior criteria. Specifically, this coupon targeting system can be implemented at the user's client device to match the user's behavior to the vendor's criteria, and does not release sensitive information about the user to a vendor's server before the user desires to accept the coupon. This allows the vendor to deliver a targeted coupon to users that are eligible to receive the coupon, and allows users to keep their behavioral data private.

For example, the coupon server can send multiple coupons to the client device, and the coupon delivery system can select the coupons for which the user is eligible. However, the inherent value of a coupon provides users a financial incentive to discover all available coupons. Thus, the smart coupon delivery system can determine whether a user is eligible for a coupon using a protocol that ensures that non-eligible users learn nothing about the vendor's targeting strategy. However, once the user redeems a coupon, the vendor may request personal information from the user for business purposes. Also, the vendor may utilize the users' feedback, in terms of the coupon redemption results, to evaluate and improve their targeting strategies.

During operation, the coupon delivery system can generate a user-behavior vector that indicates the user's behavior pattern, and can encode this vector to participate in one of two privacy-preserving protocols: a non-interactive protocol that guarantees the users' behavioral data never leaves their device, or an interactive protocol. The non-interactive protocol is suitable when the vendor's targeting strategy for a coupon is difficult to guess. When the vendor's targeting strategy is not hard to guess (e.g., the user-behavior criteria has small entropy), the smart coupon delivery system can perform the interactive protocol that exchanges information between the coupon server and the end-user's device. Both the non-interactive and the interactive protocols preserve the user's privacy, protect the vendor's targeting strategy, and provide a robust solution that minimizes the marginal gain for a user to obtain a coupon maliciously (e.g., by guessing the vendor's targeting strategy).

Computer System

Figure 1:
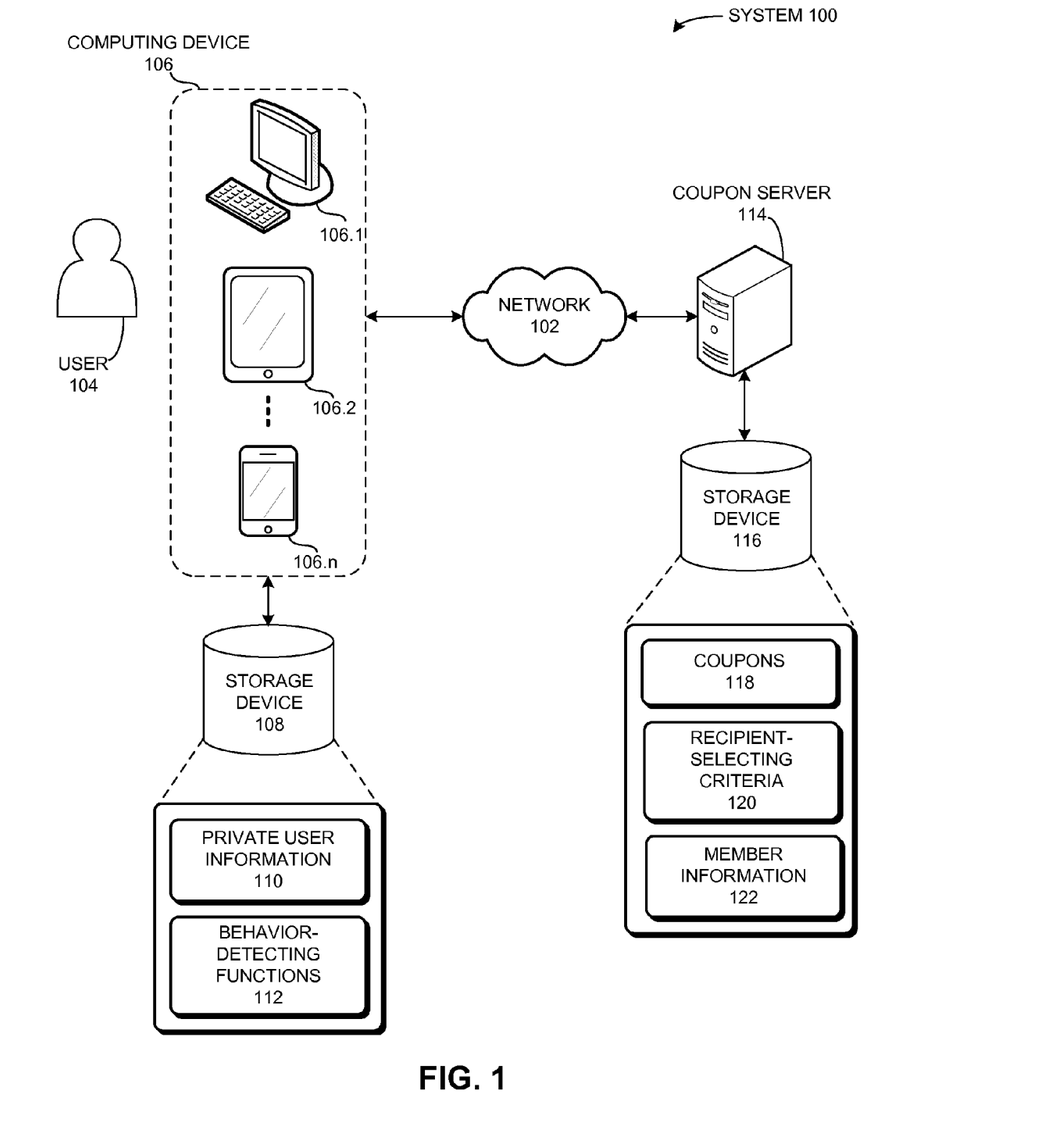
FIG. 1 illustrates an exemplary computer system for presenting a digital coupon to eligible end-users in accordance with an embodiment.

FIG. 1 illustrates an exemplary computer system 100 for presenting a digital coupon to eligible end-users in accordance with an embodiment. System 100 can include a network 102, a computing device 106 (e.g., a desktop computer 106.1, a tablet computer 106.2, or a mobile device 106.$n$), and a coupon server 114.

In some embodiments, computing device 106 can correspond to a user 104 that desires to receive personalized coupons without having to release private personal information until the user decides to accept a coupon. Computing device 106 can include a storage device 108 that stores private user information 110, and behavior-detecting functions 112. Private user information 110 can include a tally or history of personal information that indicates user behavior statistics for user 104 over multiple time intervals (e.g., statistics compiled daily, weekly, or monthly). In some embodiments, the private user information 110 can change over time to provide the most recent targeting information for vendors. Further, computing device 106 can receive encoded coupon information from coupon server 114, and can determine whether user 104 is eligible to receive the coupon based on private user information 110.

Coupon server 114 can correspond to a vendor that desires to provide user-targeted coupons without allowing ineligible users to obtain and use a coupon (e.g., without revealing the eligibility requirements for a coupon to computing device 106). Coupon server 114 can also include a storage device 116 that stores coupons 118, recipient-selecting criteria 120 for coupons 118, and member information 122. Member information 122 can include user information for individuals that have enrolled in a coupon delivery program. This user information can include basic contact information (e.g., name, mailing address, etc.), and basic demographic information (e.g., age, gender, marital status, etc.). Further, a vendor can create recipient-selecting criteria 120 for coupons 118 so that only eligible users that satisfy recipient-selecting criteria 120 for a coupon are capable of receiving the coupon.

Determining a User's Eligibility

In some embodiments, the vendor's targeting strategy and the user's behavior are represented using n-dimensional numerical vectors. The vendor's targeting strategy can be represented by an n-dimensional behavior-criteria vector $w=(w_1, w_2, \ldots, w_n)$, such that each vector entry $w_i$ indicates a criteria corresponding to a certain user behavior. Also, a user's behavior can be represented by an n-dimensional user-behavior vector $x=(x_1, x_2, \ldots, x_n)$ that includes a set of user-behavior observations collected by the user's computing device (e.g., a mobile phone) from the user's daily behavior events. A vector entry $x_i$ can indicate an observed user behavior value that corresponds to the vendor's behavior-criteria $w_i$.

Thus, the system can determine whether the user is eligible to receive a coupon by performing an eligibility test between the vendor's targeting strategy w and the user's behavior x. The system can perform the eligibility test at the user's computing device to preserve the user's privacy (e.g., to prevent uploading the vector x to the vendor's server), and does so by operating on encoded versions of both vectors w and x to protect the vendor's targeting strategy.

Figure 2:
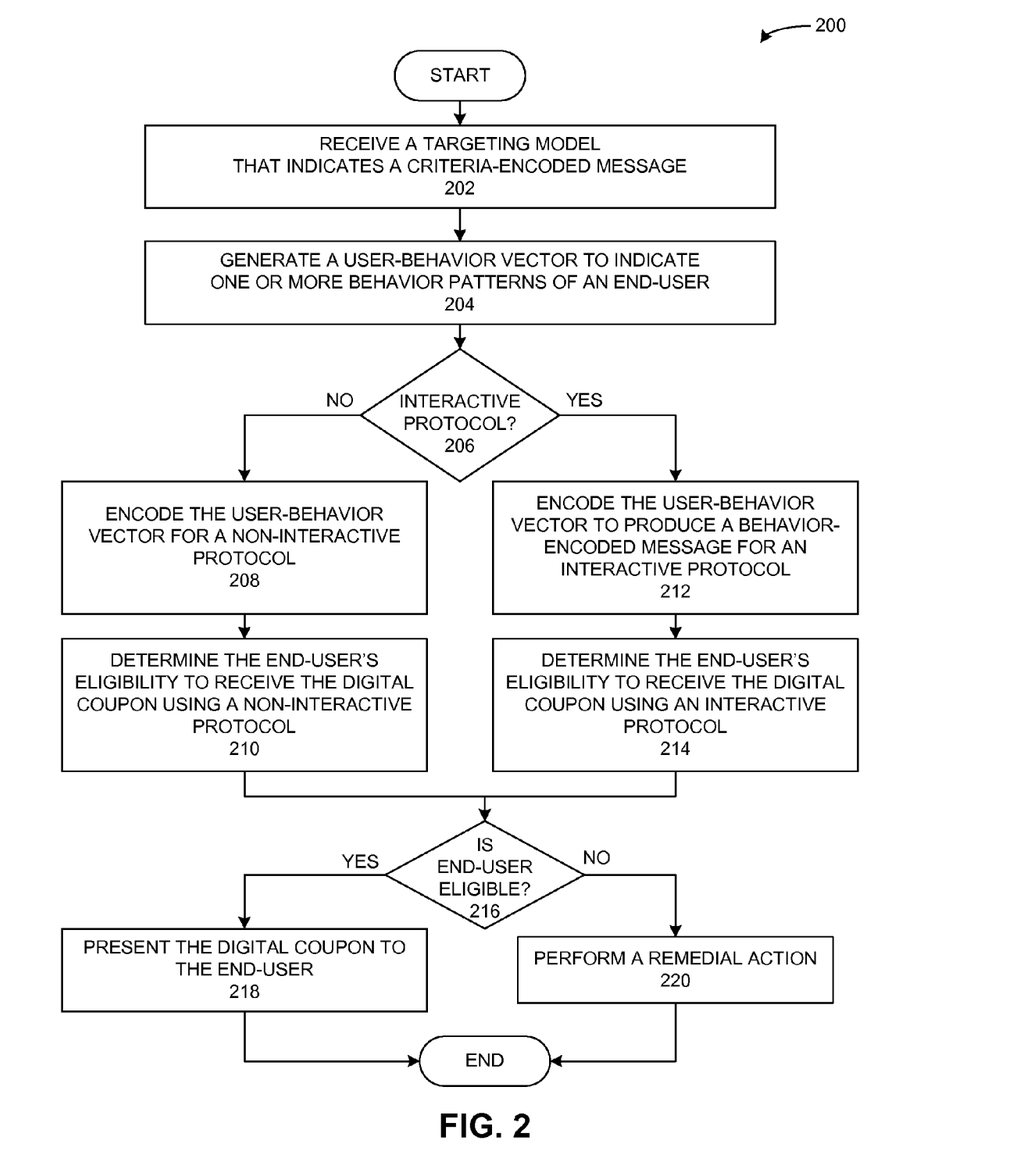
FIG. 2 presents a flow chart illustrating a method for performing behavior-targeted coupon delivery in accordance with an embodiment.

FIG. 2 presents a flow chart illustrating a method 200 for performing behavior-targeted coupon delivery in accordance with an embodiment. During operation, the system can receive a targeting model that indicates a criteria-encoded message, which the vendor has encoded using the behavior-criteria vector w (operation 202). In some embodiments, the targeting model can also indicate a set of behavior-encoding functions, or a class of functions, that the system is to use when generating the user-behavior vector x (e.g., functions provided by a library in the user's client device, or functions provided in the targeting model). Then, the system can generate the user-behavior vector, x, to indicate one or more behavior patterns of the end-user (operation 204).

The system then determines from the targeting model whether the coupon server intends initiate an interactive protocol (operation 206). If the protocol is not to be interactive (e.g., the behavior-criteria vector, w, is difficult to guess), the system can encode the user-behavior vector for the non-interactive protocol (operation 208), and can determine the end-user's coupon eligibility using the non-interactive protocol (operation 210).

However, if the system determines during operation 206 that the coupon server intends to initiate an interactive protocol, the system can encode the user-behavior vector to produce a behavior-encoded message for the interactive protocol (operation 212). The system then determines the end-user's coupon eligibility using the interactive protocol (operation 214).

Next, if the end-user is eligible to receive the digital coupon (operation 216), the system can present the digital coupon to the end-user (operation 218). However, if the system determines at operation 216 that the end-user is not eligible to receive the digital coupon, the system can perform a remedial action (operation 220).

Figure 3A:
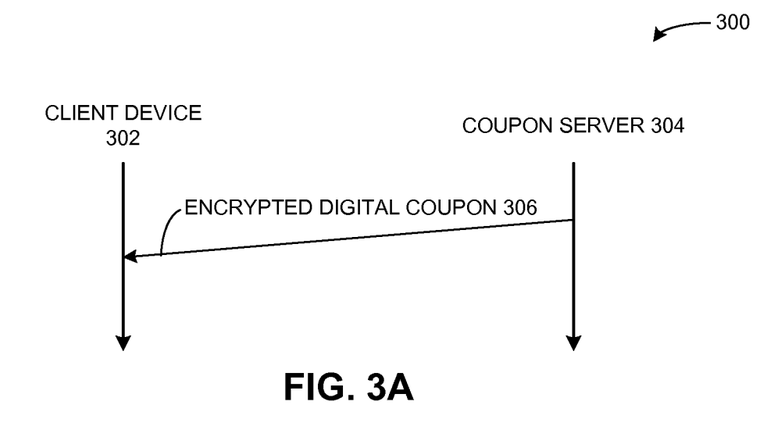
FIG. 3A illustrates exemplary communication between a client device and a coupon server for transferring a digital coupon during a non-interactive protocol in accordance with an embodiment.

FIG. 3A illustrates exemplary communication 300 between a client device and a coupon server for transferring a digital coupon during a non-interactive protocol in accordance with an embodiment. During operation, a client device 302 can receive an encrypted digital coupon 306 from a coupon server 304. Also, client device 302 can store a persistent targeting model corresponding to coupon server 304, or can receive an updated targeting model along with encrypted digital coupon 306. The targeting model can include a version of the vendor's behavior-criteria vector that has been encoded, for example, using locality-sensitive hashing (LSH).

Client device 302 can then compare the LSH-encoded versions of the user-behavior vector and the vendor's behavior-criteria vector to perform a blind matching that determines the user's eligibility for a coupon. If client device 302 determines that the user is eligible to receive the coupon, client device 302 can decrypt the digital coupon using a key generated based on the LSH-encoded version of the user-behavior vector. The user is able to decrypt the digital coupon only if the user is eligible to receive the digital coupon. Thus, during this non-interactive protocol, the user's personal information (e.g., the user-behavior vector) does not leave client device 302 before the user decides to accept the coupon, and coupon server 304 does not need to process requests from client devices that have not accepted a coupon.

In some embodiments, client device 302 can provide the user with an option to accept or reject the coupon once device 302 determines the user is eligible. If the user decides to accept the coupon, client device 302 can send additional information about the user to coupon server 304 (e.g., current geographic location), which can be used by the vendor to adjust the targeting strategy.

Figure 3B:
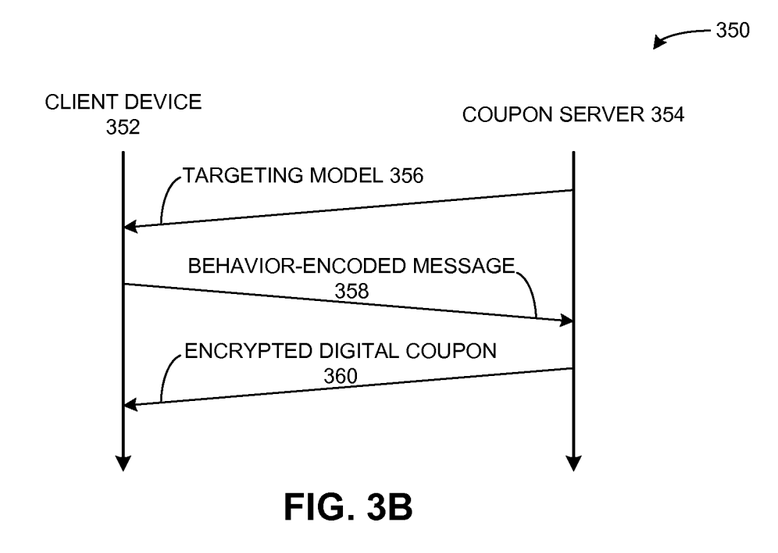
FIG. 3B illustrates exemplary communication between a client device and a coupon server for transferring an encrypted digital coupon during an interactive protocol in accordance with an embodiment.

FIG. 3B illustrates exemplary communication 350 between a client device and a coupon server for transferring an encrypted digital coupon during an interactive protocol in accordance with an embodiment. In the interactive protocol, the coupon server and the user's system exchange secrets using encrypted messages to generate a shared key. During operation, a client device 352 can receive a targeting model 356 from a coupon server 354 in a protected form. The targeting model 356 can include a secret from the coupon server that's encrypted using the vendor's behavior-criteria vector as the encryption key. Client device 352 then responds by sending, to coupon server 354, a behavior-encoded message 358 that includes a secret that's encrypted using the user's user-behavior vector as the encryption key.

Client device 352 and coupon server 354 exchange secrets successfully if the user's user-behavior vector matches the vendor's behavior-criteria vector (e.g., if the user is eligible to receive the coupon). This successful exchange allows client device 352 and coupon server 354 to generate the same shared key from the exchanged secrets. Coupon server 354 then encrypts the digital coupon using its shared key, and sends an encrypted digital coupon 360 to client device 352. Client device 352 will successfully decrypt encrypted digital coupon 360 if the end-user is eligible to receive the digital coupon.

Locality Sensitive Hashing

Locality-sensitive hashing (LSH) provides a method to perform probabilistic dimension reduction of high-dimensional data. The system performs LSH by hashing the vector entries in x using specially-designed locality-sensitive hash functions that ensure the collision probability is much higher for similar data points (e.g., numerical values whose difference is within a determinable amount) than for those that are far away. In some embodiments, LSH can be defined over a cosine distance, a Euclidean distance, a Hamming distance, or any other distance metric now known or later developed.

The cosine distance metric can be represented by the angle between the two vectors w and x:

$$\Theta(w, x) = \cos^{-1}\left(\frac{w \cdot x}{\|w\| \cdot \|x\|}\right) \quad (1)$$

In some embodiments, the LSH family $\mathcal{F}$ is defined as follows. Given an n-dimensional random vector r where each vector entry $r_i \in r$ is obtained from the Gaussian distribution $\mathcal{N}(0,1)$ independently, the hash function $f_r(\bullet)$ computed over an n-dimensional vector q is given by:

$$f_r(q) = \begin{cases} 1 & \text{if } r \cdot q \geq 0 \\ 0 & \text{if } r \cdot q < 0 \end{cases} \quad (2)$$

Hash function $f_r(\bullet)$ divides the entire vector input space by a hyperplane represented by the vector r, and any two vectors lying on the same side of the hyperplane defined by r hash to the same value. Thus, the likelihood of two vectors w and x hashing to the same LSH value depends on their cosine similarity:

$$p = Pr[f_r(w) = f_r(x)] = 1 - \frac{\Theta(w, x)}{\pi} \quad (3)$$

Given that one hash function $f_r(\bullet)$ from the family $\mathcal{F}$ does not give accurate enough results for the locality sensitive hash, the system uses a set of K hash functions $f_{r1}, f_{r2}, \ldots,$ $f_{r_K}$ denoted as $F(\bullet)$. The system computes the final hash result by concatenating the individual hash results for the K hash functions in $F(\bullet)$. Thus, the K-bit LSH function, $F(\bullet)$, maps an n-dimensional vector x into a K-bit string.

Because LSH has the property where similar vectors are hashed together, LSH does not provide the one-way property of a cryptographic function. Thus, it is possible for an adversary to infer information about the pre-image of LSH (e.g., the user-behavior vector x) from the LSH results. In some embodiments, the system enhances the security strength by using a cryptographic hash function $h(\bullet)$ (e.g., SHA1) to encrypt the LSH results before performing the targeted coupon delivery protocol.

For example, during the non-interactive protocol (e.g., FIG. 3A), the coupon server can send the encrypted LSH result $h(F(w))$ and the LSH hash function $F(\bullet)$ to the client device. The client device then determines whether the user is eligible by computing $F(x)$ and testing whether $h(F(x))$ and $h(F(w))$ match. If these encrypted LSH results match, the user is potentially eligible to redeem a coupon. Otherwise, the user learns nothing about the $F(w)$ from the received hash values due to the one-way property of they cryptographic hash function $h(\bullet)$.

Non-Interactive Protocol

Figure 4:
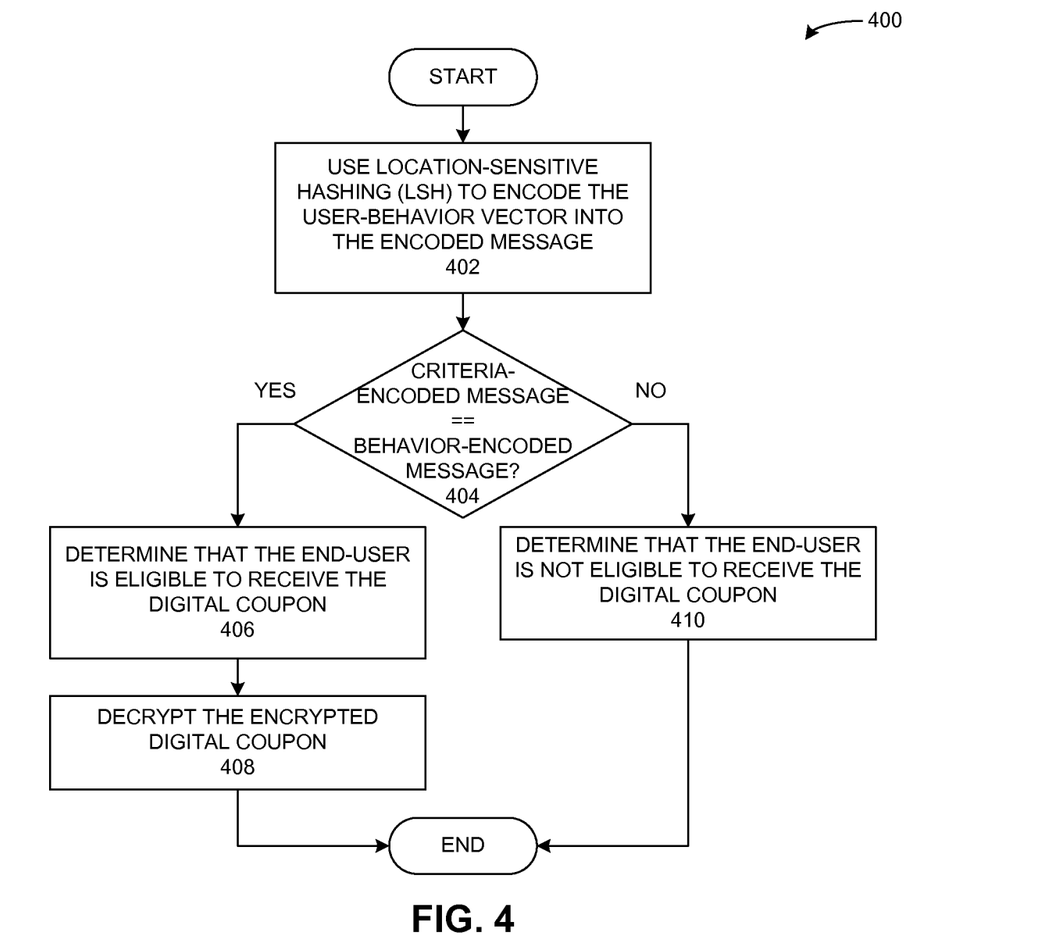
FIG. 4 presents a flow chart illustrating a method for determining whether a user is eligible to receive a digital coupon during a non-interactive protocol in accordance with an embodiment.

FIG. 4 presents a flow chart illustrating a method 400 for determining whether a user is eligible to receive a digital coupon during a non-interactive protocol in accordance with an embodiment. Recall that in the non-interactive protocol, the coupon server generates the criteria-encoded message by using a location-sensitive hashing (LSH) function F to encode the behavior-criteria vector. For example, the vendor's targeting model can include $h(F(w))$ and $F(\bullet)$.

Thus, in some embodiments, the system can generate the behavior-encoded message as a counterpart to the vendor's criteria-encoded message by using location-sensitive hashing to encode the user-behavior vector (operation 402). Then, to determine whether the end-user is eligible to receive the coupon, the system compares the criteria-encoded message to the behavior-encoded message (operation 404). For example, the system can test whether the criteria-encoded message $h(F(w))$ and the behavior-encoded message $h(F(x))$ match. If they do match, the system determines that the end-user is eligible to receive the digital coupon (operation 406) and decrypts the encrypted digital coupon (operation 408).

In some embodiments, the digital coupon can be encrypted in the form: $Enc_{key}(coupon\|UID\|nonce\|Sign)$. Here, coupon denotes the digital coupon, UID indicates a unique identifier for the user, nonce indicates a random number corresponding to the received hash value. Also, $\phi(\bullet)$ indicates a pseudorandom function, $Enc(\bullet)$ indicates a semantically secure encryption function, and $Sig(\bullet)$ indicates a secure digital signature scheme. Thus, the coupon server can generate the encrypted coupon using key=$\phi(F(w))$, and $Sign=Sig_{vendor}(coupon\|UID\|nonce)$.

The user's system can generate a trapdoor key to decrypt the coupon by computing key=$\phi(F(x))$, where x denotes the user's user-behavior vector. If the user accepts to redeem the coupon, the system can send $(coupon\|UID\|nonce\|Sign)$ to the coupon server, and the coupon server can verify the signature Sign to determine the validity of the coupon.

However, if the system determines at operation 404 that the criteria-encoded message $h(F(w))$ and the behavior-encoded message $h(F(x))$ do not match, the system can determine that the end-user is not eligible to receive the digital coupon (operation 410).

Interactive Protocol

In some embodiments, the vendor's targeting strategy for a coupon can be deterministic (e.g., precisely defined) instead of approximate. For example, the vendor may be interested to determine whether the user has or has not visited the vendor's coffee shop, or whether the user has visited a competing vendor exactly 10 times over the past month. Thus, when the targeting strategy is deterministic, the system does not need to encode the behavior-criteria vector w using LSH given that there would be a one-to-one mapping between the vector w and the encoded vector $F(w)$.

Further, these deterministic rules usually are not complicated, and thus they can have undesirably low entropy. This low entropy can be due to the small variance for each rule in the targeting strategy (e.g., simple true/false values), or due to the fact that the vector w has a small number of constrained values (e.g., only a few entries in w are considered). Thus, the coupon server should not send the hash value $h(w)$ or $h(F(w))$ to a user's client device in the non-interactive protocol because the user is able to guess the entry values for w (e.g., using brute-force guessing).

In some embodiments, the system performs behavior-targeted coupon delivery when the targeting strategy is deterministic by participating in an interactive protocol with the coupon server during the coupon delivery session. This interactive coupon-delivery protocol ensures that the vendor's targeting strategy is protected against ineligible users, and the user's behavioral data is not revealed to the vendor until an eligible user decides to redeem the coupon. Further, the client device and the coupon server can use a password authenticated key exchange (PAKE) protocol to generate a shared key, and the coupon server can provide the client device an encrypted coupon that has been encrypted using the shared key. During the key-exchange operation, the client device and the coupon server can use the user-behavior and behavior-criteria vectors, respectively, to generate a password for the key-exchange operation. Some examples for a PAKE protocol include encrypted key exchange (EKE), simple password exponential key exchange (SPEKE), secure random password (SRP), etc.

For example, the vendor may only be interested in m entries of the behavior-criteria vector w, such that the entries of interest are indicated by index $\mathcal{J}=(i_1, i_2, \ldots, i_m)$. Thus, during the EKE protocol, the vendor can generate the criteria-encoded message as follows. Let $\mathbb{G}$ denotes a finite cyclic group with generator g. This group could be $\mathbb{Z}^*_P$, where P can a large prime number (e.g., with 1024 bits). The variables g, P and the hash function $h(\bullet)$ are public, and in some embodiments, the system can receive g, P and $h(\bullet)$ in the targeting model from the vendor.

The coupon server can pick a random value r, and computes a criteria-encoded key from the behavior-criteria vector. For example, the system can select the behavior-criteria vector entries $\{w_i\}$ based on the indexes $\mathcal{J}$, and computes the criteria-encoded key as a function of the selected entries $\{w_i\}$ (e.g., a concatenation function, a hash function, etc.). In some embodiments, the system can generate the criteria-encoded key using the hash function, h, as follows:

$$H_v = h(w_{i_1}\|w_{i_2}\|\ldots\|w_{i_m}\|r). \tag{4}$$

The coupon server also selects a random secret value, $a \in \mathbb{Z}^*_P$, and creates the criteria-encoded message $\{Enc_{H_v}(a), r, \mathcal{J}\}$ by encrypting the secret with the criteria-encoded key $H_v$. The coupon server then sends the criteria-encoded message to the user's computing device. Then, during the interactive protocol, the coupon delivery system at the user's client device decrypts the vendor's secret with a behavior-encoded key, and uses the vendor's secret to generate a shared key. The system generates the shared key successfully if the end-user is eligible to receive the digital coupon.

Figure 5:
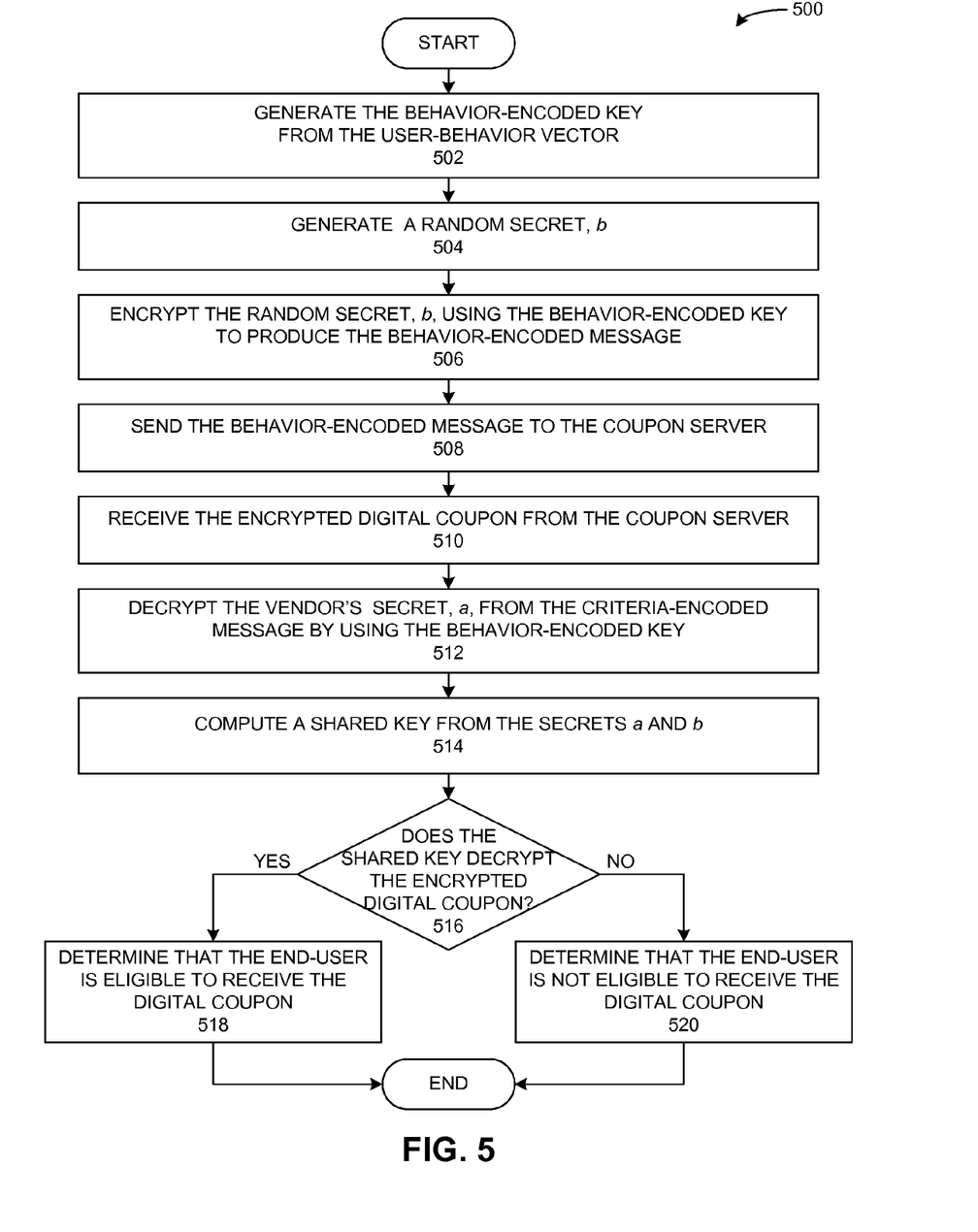
FIG. 5 presents a flow chart illustrating a method for determining whether a user is eligible to receive a digital coupon during an interactive protocol in accordance with an embodiment.

FIG. 5 presents a flow chart illustrating a method 500 for determining whether a user is eligible to receive a digital coupon during an interactive protocol in accordance with an embodiment. During operation, the system can generate the behavior-encoded key from the user-behavior vector (operation 502). For example, the system can select the user-behavior vector entries $\{x_i\}$ based on the indexes $\mathcal{I}$, and computes the behavior-encoded key as a function of the selected entries $\{x_i\}$ (e.g., a concatenation function, a hash function, etc.). In some embodiments, the system can generate the behavior-encoded key using the hash function, h, as follows:

$$H_x = h(x_{i_1} \| x_{i_2} \| \ldots \| x_{i_m} \| r). \quad (5)$$

Then, to perform the EKE protocol, system generates a random secret b, where $b \in Z^*_P$ (operation 504), and encrypts the random secret using the behavior-encoded key $H_x$ as the encryption key to produce the behavior-encoded message $Enc_{H_x}(b)$ (operation 506). Further, the system then sends the behavior-encoded message to the coupon server (operation 508), and the coupon server decrypts the behavior-encoded message, $Enc_{H_x}(b)$, using the criteria-encoded key, $H_v$, to obtain a decrypted value V. The coupon server also computes a shared key, $k_a$, from the decrypted value V and a random secret a (generated by the coupon server). Then, the coupon server encrypts the digital coupon using the shared key: $Enc_{k_a}$(coupon$\|$UID$\|$nonce$_i\|$Sign$_i$).

Next, the system receives the encrypted digital coupon from the coupon server (operation 510). The system then decrypts the criteria-encoded message, $Enc_{H_v}(a)$, using the behavior-encoded key, $H_x$, to obtain the vendor's secret value X (operation 512), and computes a shared key, $k_b$, from the decrypted value X and the random secret b (operation 514). After operation 512, if $H_v = H_x$, then V=b for the coupon server, and X=a for the user's system. Otherwise, both V and X are indistinguishable random values.

Then, to determine whether the end-user is eligible to receive the coupon, the system determines whether the local shared key decrypts the vendor's encrypted digital coupon (operation 516). If the user has satisfied the vendor's behavior criteria, the system will be successful in using the user's behavior-encoded key to decrypt the vendor's secret from the criteria-encoded message, and will be successful in generating the shared key. Thus, if the system determines that the shared key decrypts the encrypted digital coupon (e.g., that $k_b$ decrypts $Enc_{k_a}$(coupon$\|$UID$\|$nonce$_i\|$Sign$_i$)), the system determines that the end-user is eligible to receive the digital coupon (operation 518). However, if the system determines at operation 516 that the shared key does not decrypt the encrypted digital coupon, the system determines that the end-user is not eligible to receive the digital coupon (operation 520).

In some embodiments, the system can prevent users from using a fake user-behavior vector by sending the user's behavior information to the coupon server using a hash value $h(x_i\|i\|k_i)$ (e.g., during operation 508 before receiving the encrypted digital coupon). Then, if an eligible user decides to redeem the coupon, the system can send the value $k_i$ to the coupon server so that the coupon server can determine whether $h(w_i\|i\|k_i) = h(x_i\|i\|k_i)$ to verify the user's behavior $x_i$. Further, if a user does not accept the digital coupon, the coupon server does not determine the user's behavior information $x_i$, and is not able to decrypt the commitment without knowing $k_i$.

Hybrid Protocols

In some embodiments, the system can participate in a hybrid protocol where the system uses the non-interactive protocol to determine the user's approximate eligibility, and can use the interactive protocol to determine whether the user is eligible to receive a certain coupon. For example, the system can participate in a first coupon-targeting round to receive several LSH-encoded behavior-criteria vectors that correspond to a variety of coupons (or coupon categories) that the user may be eligible for. The system can then use the non-interactive protocol to determine which of these coupons or categories, if any, the user is eligible for based on a loose coupon targeting strategy. The first-round coupon targeting strategy may indicate general criteria such as basic demographic information (e.g., an age, a zip code, etc.) or basic behavior information.

Then, if the user is eligible for a coupon (or a coupon category), the system can provide a low-value coupon (e.g., "$1 off your next purchase at store X") to the user. Also, the system can give the eligible user an option to proceed to a second coupon-targeting round to determine whether the user qualifies for a higher-valued coupon. The second round can involve a deterministic targeting strategy that provides the user with an opportunity to receive a high-valued coupon (e.g., within the same or similar category to the coupon or category of the first round). If the user decides to opt-in to the second round, the system can perform the interactive protocol to determine whether the user is eligible to the high-valued coupon based on a more-personalized targeting strategy. The second-round targeting strategy may indicate deterministic criteria such as whether the user has visited store X a total of N times the past month. Thus, the second-round coupon can be targeted to users that are important and highly loyal to the vendor. Further, a user may be willing to reveal more personal information when redeeming a coupon that is more personalized to him or has a higher value.

In some other embodiments, a hybrid protocol can allow the vendor to offer a coupon to a user based on simultaneous deterministic and approximate eligibility requirements. The system can receive both the LSH results (for the approximate eligibility requirements) and the deterministic eligibility requirements in the cryptographic hash $h(\bullet)$ (e.g., in the criteria-encoded message) of either the non-interactive protocol or the interactive protocol. For example, in the interactive protocol, the coupon server can generate the criteria-encoded message as follows:

$$H_v = h(w_{i_1} \| w_{i_2} \| \ldots \| w_{i_m} \| F(\overline{w}) \| r) \quad (6)$$

Here, $\overline{w}$ contains the n–m remaining entries of the original behavior-criteria vector w corresponding to the approximate match.

Generating a User-Behavior Vector

In some embodiments, the coupon delivery system facilitates providing a coupon to a user to remind him of a business or service, but without interrupting the user. The system profiles the user's behavior to gather sufficient information to make a decision as to whether the user is eligible to receive a certain coupon. However, the user's eligibility can depend on many factors. For example, the user's eligibility may depend on whether the user is loyal to the vendor. The system can quantify the user's loyalty based partially on a number of times the user has visited the vendor's particular business during the past month (e.g., a brick-and-mortar store or an e-commerce Web page). Further, the system can also quantify the user's loyalty based partially on the user's past purchasing behavior from this vendor.

The system can also determine the user's eligibility based on other related factors, such as an amount by which the user is loyal to a competitor. To quantify this, the system can quantify loyalty in a similar manner as mentioned above, but including user behavior information corresponding to any other business that falls within the same business category as the vendor of interest. This can allow a vendor to send coupons to users who have a high likelihood to become loyal repeat customers.

In some embodiments, the system can quantify the user behavior based on the user's raw behavior data to generate the user-behavior vector x. Mobile devices provide a wide variety of raw user behavior data, which can be extracted, for example, from a browsing history, a geographic trace, purchasing information, and a message to or from a personal contact. Thus, in some embodiments, the system can include a library of behavior-detecting functions that can detect user behavior events from the user's raw behavior data. The system can invoke a set of these behavior-detecting functions (e.g., as indicated by the vendor's targeting model) to generate the user-behavior vector x so that it corresponds to the vendor's behavior-criteria vector w. For example, the system can invoke a set of behavior-detecting functions $F_B = \{f_{B1}, f_{B2}, \ldots, f_{Bn}\}$, such that the system uses a behavior-detecting function $f_{Bi}$ to generate a numeric value for vector element $x_i$.

Further, the targeting model can also indicate parameter information for behavior-detecting functions $F_B$. For example, the behavior-detecting function $f_{Bi}$ may determine a number of times the user has been at a certain business venue, and can take as input parameter information $p_i$ that indicates the global-positioning system (GPS) coordinates for the venue. In some embodiments, the parameter information $p_i$ can indicate the venue by its street address, and the system can determine the corresponding GPS coordinates using a public geocoding Web service. In some other embodiments, the parameter information $p_i$ can indicate the venue by its business name, and the system can use the public geocoding Web service to determine one or more GPS locations that correspond to this business name and are within a determinable distance from the user's current location or history of locations. Then, the system can process the behavior-detecting function $f_{Bi}$ using the various GPS coordinates.

Figure 6:
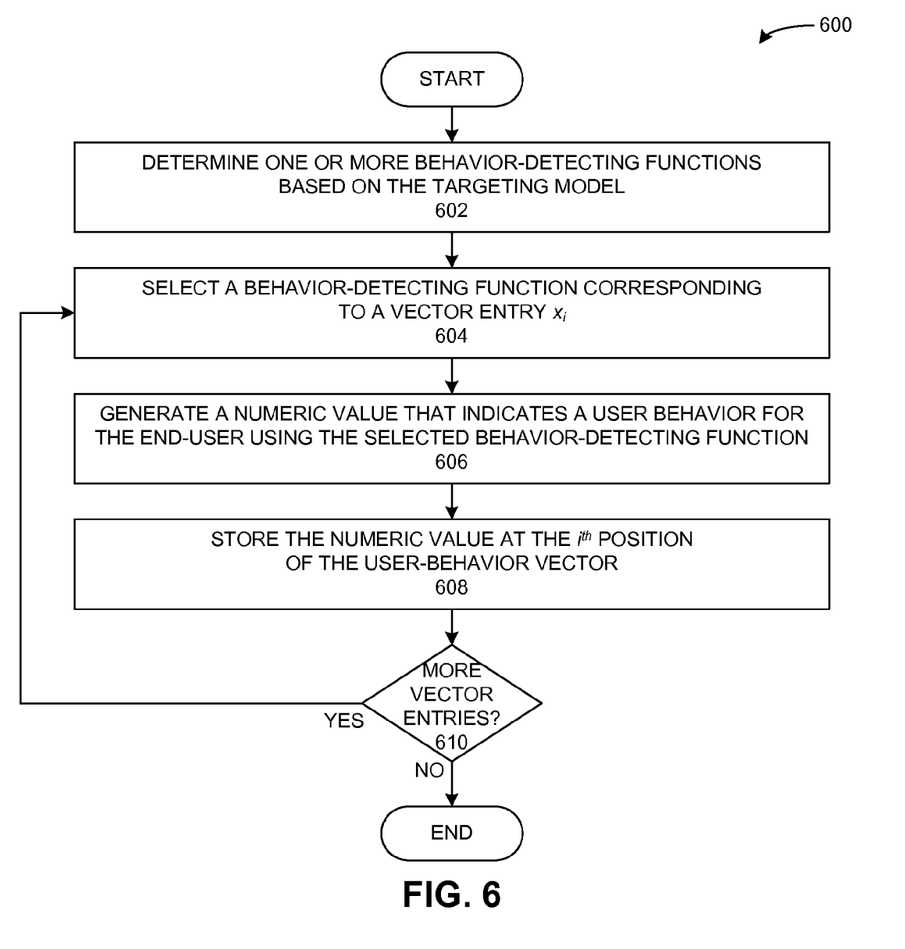
FIG. 6 presents a flow chart illustrating a method for generating a user-behavior vector for an end-user in accordance with an embodiment.

FIG. 6 presents a flow chart illustrating a method 600 for generating a user-behavior vector for an end-user in accordance with an embodiment. During operation, the system can determine one or more behavior-detecting functions based on the targeting model (operation 602), and selects a behavior-detecting function corresponding to a vector entry $x_i$ (operation 604).

The system then generates a numeric value that indicates a user behavior for the end-user using the selected behavior-detecting function (operation 606), and stores the numeric value at the $i^{th}$ position of the user-behavior vector x (operation 608). Then, the system determines whether it needs to generate a numeric value for other vector entries in x (operation 610). If so, the system can return to operation 604 to select another behavior-detecting function. Otherwise, the system has completed generating the user-behavior vector x.

The following paragraphs provide a plurality of exemplary behavior-detecting functions that take parameter values $p_i$ as input.

Browsing Data Information

1) Total number of visit to the webpages falling into the vendor's product categories $p_{i_1}$ in the last $p_{i_2}$ days. This behavior information indicates the user's recent interests.

2) Fraction of webpage viewed that can be categorized into vendor's product line, $p_{i_1}$, over all webpage views. This behavior information indicates the user's loyalty to the vendor of interest.

3) Fraction of webpage views from vendor's website $p_{i_1}$ over competitor's websites $p_{i_2}$. This behavior information indicates the user's interest and loyalty.

4) Total number of search queries in the last $p_{i_1}$ days that can be categorized into vendor's campaigned product $p_{i_2}$. This behavior information indicates the user's recent interest.

5) Fraction of potentially valid queries that can be categorized into vendor's campaigned product line, $p_{i_1}$, over all queries searched, say about 10%. This behavior information indicates the user's overall interest/intent.

6) Fraction of potentially valid queries that lead to vendor's website, $p_{i_1}$, over that of a competing vendor's product website $p_{i_2}$. This behavior information indicates the user's loyalty to the vendor.

In some embodiments, the vendor can generate an exemplary behavior-criteria vector w that indicates target values for the preceding functions: w=(5, 20%, 1.33, 20, 10%, 5).

Geolocation Trace Information

1) Total number of times vendor's retail store, $p_{i_1}$, has been recently visited in the past $p_{i_2}$ days. This behavior information indicates the user's current interest.

2) Fraction of visits at vendor's retail store, $p_{i_1}$, and all shopping stores. This behavior information indicates the user's overall interest.

3) Fraction of visits at vendor's retail store, $p_{i_1}$, and the competitor's retail store, $p_{i_2}$. This behavior information indicates the user's loyalty.

4) Total time in hours the user has spent at retail stores for vendor $p_{i_1}$. This behavior information indicates the user's interest.

5) The time in days since the user's last visit to a retail store for vendor $p_{i_1}$. This behavior information indicates whether the user is in the market.

In some embodiments, the vendor can generate an exemplary behavior-criteria vector w that indicates target values for the preceding functions: w=(5, 5%, 2, 2, 7).

Purchasing Data Features

1) Total purchases made in the last $p_{i_1}$ days. This behavior information indicates the user's purchasing habits.

2) Total purchases of similar products falling into product lines for vendor $p_{i_1}$. This behavior information indicates whether the user has a potential buying interest.

3) Fraction of other purchases that could lead to a purchase from vendor $p_{i_1}$ over all purchases. This behavior information indicates whether the user has a potential purchasing need. For example, the user buying a football can lead to the user also buying a pair of shoes. Further, the user reserving a hiking trip online can lead to the user also buying a pair of shoes.

4) Fraction of purchases with coupons over all purchases. This behavior information indicates whether the user likes using coupons.

5) The time duration since the last purchase made by the user for a product from vendor $p_{i_1}$. This behavior information indicates whether the user is in the market.

In some embodiments, the vendor can generate an exemplary behavior-criteria vector w that indicates target values for the preceding functions: (10, −2, 10%, 90%, 20).

Messaging/Contact Features

1) Fraction of messages that contain keywords falling into a product line category for vendor $p_{i_1}$. This behavior information indicates the user's interest.

2) The number of the user's recent contacts that have purchased a product from vendor $p_{t_i}$. This behavior information indicates whether the user's potential intent of buying a vendor's products.

In some embodiments, the vendor can generate an exemplary behavior-criteria vector w that indicates target values for the preceding functions: (5%, 2).

The system can also include other behavior-detecting functions that detect user behavior patterns for the user's purchasing interest, purchasing need, previous exposure/usage of coupons, convenience to purchase a product, etc. These types of behavior patterns provide consumer insight that is valuable to the vendor's marketing strategy.

In some embodiments, the system can include a basic behavior-detecting function, and can receive a vendor-specific behavior-detecting function (e.g., via the vendor's targeting model) that generates a numeric value based on one or more basic behavior-detecting functions. For example, the basic behavior-detecting functions can determine:

the user's current location;
a number of times the user has visited a certain location or type of location $p_x$ (e.g., a shoe store) within the last $p_t$ days;
a number of times the user has visited a certain website or website category $p_x$ within the last $p_t$ days;
a number of times a user has mentioned a certain keyword $p_x$ in a message within the last $p_t$ days;
a number of purchases the user has made within a certain product category $p_x$ within the last $p_t$ days.

Further, if the vendor does not provide a value for $p_x$ or a value for $p_t$, the system can compute the basic behavior-detecting function over all values of $p_x$ or $p_t$, respectively.

Advanced LSH Encoding

The vector size for the behavior-criteria vector w and the user-behavior vector x influences the probability that the vendor's and the user's LSH results will match, and influences the likelihood that a user can generate a fake user-behavior vector x that renders him eligible for a coupon. In some embodiments, the system can generate the LSH results $F(\cdot)$ into a K-bit string, so that K is sufficiently large (e.g., K=80) to make it difficult for a malicious user to guess the LSH result F(w). However, a larger K value could also reduce the probability of two similar vectors hashing into the same LSH result $F(\cdot)$ given that $p > p^K$ for any $0<p<1$ and $K>1$ (see Eq. (3)). Thus, increasing the value for K can result in less or possibly no successful matches between vectors w and x because the success of the eligibility test depends on the similarity of the two vectors.

In some embodiments, the system maintains the correctness of the high probability matching by receiving a set of L independent concatenated LSH functions $F_1(\cdot), F_2(\cdot), \ldots, F_L(\cdot)$ from the coupon server, and determining whether any of the L hash functions causes the hashed results for w and x to match. The probability that the user finds any match among the L hash values is at least $1-(1-p^K)^L$, where p is determined by the similarity of w and x via Eq. (1). Thus, by increasing the number of independent LSH functions L, the likelihood for a match also increases: $1-(1-p^K)^L$, which provides a high-probability that a match results in a true positive during the eligibility test. Further, by increasing K, the value of $1-(1-p^K)^L$ decreases to further suppress the low-probability that a match results in a false positive. Therefore, choosing large K and L amplifies the gap between the true positive and false positive results from the eligibility test.

The system can receive an LSH hash function $F_i(\cdot)$, for example, by receiving a seed value, $s_i$, for the hash function $F_i(\cdot)$. Further, when the coupon server sends $h(F_i(w))$ to each user's client device, where $i=1, 2, \ldots, L$, the coupon server selects a seed value $s_i$ for each user so that the individual LSH results $F_i(w)$ have at least a 1-bit difference across the different users. These encoding differences can ensure that key=$\phi$ ($F_i(x)$) is valid for one specific coupon-delivery session (e.g., valid for one specific user, and for one specific coupon for this user during the session).

Figure 7:
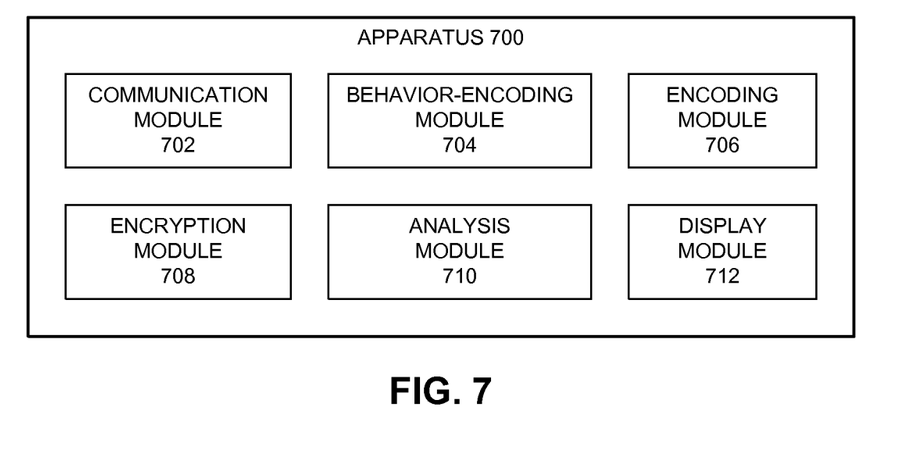
FIG. 7 illustrates an exemplary apparatus that facilitates presenting a digital coupon to an eligible end-user in accordance with an embodiment.

FIG. 7 illustrates an exemplary apparatus 700 that facilitates presenting a digital coupon to an eligible end-user in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, a behavior-encoding module 704, an encoding module 706, a decoding module 708, an analysis module 710, and a display module 712.

In some embodiments, communication module 702 can receive a criteria-encoded message from a coupon server, such that the criteria-encoded message is generated from a behavior-criteria vector that indicates criteria for selecting a recipient of a digital coupon. Behavior-encoding module 704 can generate a user-behavior vector to indicate one or more behavior patterns of an end-user. Further, encoding module 706 can encode the user-behavior vector to produce a behavior-encoded message for a non-interactive protocol or an interactive protocol. In some embodiments, during the interactive protocol, decoding module 708 can decrypt a vendor's secret from the criteria-encoded message, and communication module 702 can send the behavior-encoded message to the coupon server.

Analysis module 710 can determine whether the end-user is eligible to receive the digital coupon based on the criteria-encoded message and the behavior-encoded message. Display module 712 can present the digital coupon to the end-user responsive to the analysis module determining that the end-user is eligible to receive the digital coupon.

Figure 8:
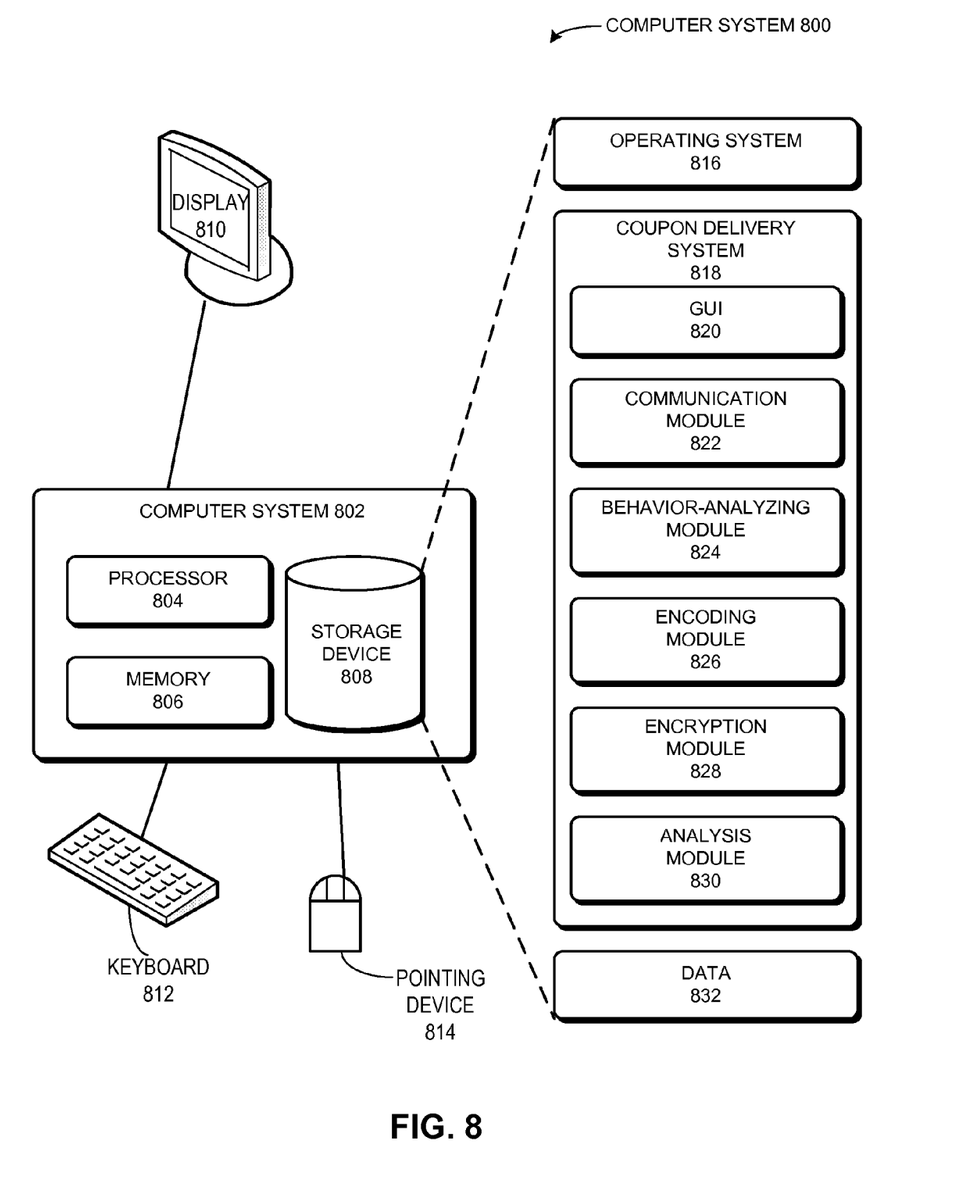
FIG. 8 illustrates an exemplary computer system that facilitates presenting a digital coupon to an eligible end-user in accordance with an embodiment.

FIG. 8 illustrates an exemplary computer system 802 that facilitates presenting a digital coupon to an eligible end-user in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, a coupon delivery system 818, and data 832.

Coupon delivery system 818 can include instructions, which when executed by computer system 802, can cause computer system 802 to perform methods and/or processes described in this disclosure. Specifically, coupon delivery system 818 can include instructions for presenting a graphical user interface (GUI) to a user (GUI 820), and can include instructions for receiving a criteria-encoded message from a coupon server (communication module 822). The criteria-encoded message can be generated by a coupon server from a behavior-criteria vector that indicates criteria for selecting a recipient of a digital coupon.

Coupon delivery system 818 can also include instructions for generating a user-behavior vector to indicate one or more behavior patterns of an end-user (behavior-analyzing module 824). Further, coupon delivery system 818 can include instructions for encoding the user-behavior vector to produce a behavior-encoded message for a non-interactive protocol or an interactive protocol (encoding module 826). Coupon delivery system 818 can also include instructions for decrypting the vendor's secret from the criteria-encoded message during the interactive protocol (decoding module 828). Coupon delivery system 818 can include instructions for determining whether the end-user is eligible to receive the digital coupon based on the criteria-encoded message and the behavior-encoded message (analysis module 830).

Data 832 can include any data that is required as input or that is generated as output by the methods and/or processes described in this disclosure. Specifically, data 832 can store at least a repository of private user information, and a library of behavior-detecting functions.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
   receiving, by a computing device, a criteria-encoded message that encodes criteria for selecting a recipient of a digital coupon;
   generating, by the computing device, a user-behavior vector that includes one or more vector entries, wherein a respective vector entry includes a numeric value that characterizes a user behavior for the end-user;
   producing, by the computing device, a behavior-encoded message that encodes the end-user's behavior pattern, wherein producing the behavior-encoded message involves using a hash function to encode the user-behavior vector;
   determining, by the computing device, that the end-user is eligible to receive the digital coupon in response to detecting a match between the criteria-encoded message and the behavior-encoded message; and
   providing, by the computing device, the digital coupon to the end-user in response to determining that the user is eligible.

2. The method of claim 1, wherein the criteria-encoded message is generated by encoding the behavior-criteria vector using a locality-sensitive hash function; and
   wherein encoding the user-behavior vector to produce the behavior-encoded message comprises using the locality-sensitive hash function to encode the user-behavior vector.

3. The method of claim 2, wherein determining whether the end-user is eligible to receive the digital coupon comprises comparing the behavior-encoded message to the criteria-encoded message.

4. The method of claim 1, wherein the criteria-encoded message is generated using a criteria-encoded key to encode a first secret, and wherein the criteria-encoded key is generated from the behavior-criteria vector; and
   wherein encoding the user-behavior vector to produce the behavior-encoded message comprises:
      generating a behavior-encoded key from the user-behavior vector;
      generating a second secret; and
      encoding the second secret using the behavior-encoded key to produce the behavior-encoded message.

5. The method of claim 4, further comprising sending the behavior-encoded message, which encodes the second secret, to a coupon server.

6. The method of claim 4, further comprising receiving an encrypted digital coupon; and
   wherein determining whether the end-user is eligible to receive the digital coupon comprises:
      generating a shared key using the criteria-encoded message and the second secret; and
      determining whether the shared key decrypts the encrypted digital coupon.

7. The method of claim 6, wherein generating the shared key further comprises using the behavior-encoded key to decode the first secret from the criteria-encoded message.

8. The method of claim 1, wherein the behavior-criteria vector includes one or more numeric entries indicating a behavior criteria, and wherein each entry has a corresponding behavior-detecting function that encodes a behavior pattern of the end-user; and
   wherein generating the user-behavior vector comprises generating a numeric value for an entry of the user-behavior vector using a corresponding behavior-detecting function.

9. A non-transitory computer-readable storage medium storing instructions that when executed by a computer cause the computer to perform a method, the method comprising:
   receiving a criteria-encoded message that encodes criteria for selecting a recipient of a digital coupon;
   generating a user-behavior vector that includes one or more vector entries, wherein a respective vector entry includes a numeric value that characterizes a user behavior for the end-user;
   producing a behavior-encoded message that encodes the end-user's behavior pattern, wherein producing the behavior-encoded message involves using a hash function to encode the user-behavior vector;
   determining that the end-user is eligible to receive the digital coupon in response to detecting a match between the criteria-encoded message and the behavior-encoded message; and
   presenting the digital coupon to the end-user in response to determining that the user is eligible.

10. The storage medium of claim 9, wherein the criteria-encoded message is generated by encoding the behavior-criteria vector using a locality-sensitive hash function; and
   wherein encoding the user-behavior vector to produce the behavior-encoded message comprises using the locality-sensitive hash function to encode the user-behavior vector.

11. The storage medium of claim 10, wherein determining whether the end-user is eligible to receive the digital coupon comprises comparing the behavior-encoded message to the criteria-encoded message.

12. The storage medium of claim 9, wherein the criteria-encoded message is generated using a criteria-encoded key to encode a first secret, and wherein the criteria-encoded key is generated from the behavior-criteria vector; and
   wherein encoding the user-behavior vector to produce the behavior-encoded message comprises:
      generating a behavior-encoded key from the user-behavior vector;
      generating a second secret; and
      encoding the second secret using the behavior-encoded key to produce the behavior-encoded message.

13. The storage medium of claim 12, wherein the method further comprises sending the behavior-encoded message, which encodes the second secret, to a coupon server.

14. The storage medium of claim 12, wherein the method further comprises receiving an encrypted digital coupon; and
   wherein determining whether the end-user is eligible to receive the digital coupon comprises:
      generating a shared key using the criteria-encoded message and the second secret; and
      determining whether the shared key decrypts the encrypted digital coupon.

15. The storage medium of claim 14, wherein generating the shared key further comprises using the behavior-encoded key to decode the first secret from the criteria-encoded message.

16. The storage medium of claim 9, wherein the behavior-criteria vector includes one or more numeric entries indicating a behavior criteria, and wherein each entry has a corresponding behavior-detecting function that encodes a behavior pattern of the end-user; and
   wherein generating the user-behavior vector comprises generating a numeric value for an entry of the user-behavior vector using a corresponding behavior-detecting function.

17. An apparatus comprising:
   a processor;
   a memory coupled to the processor storing instructions to be executed by the processor, that when executed by the processor cause the apparatus to perform a method comprising:
      receiving a criteria-encoded message that encodes criteria for selecting a recipient of a digital coupon;
      generating a user-behavior vector that includes one or more vector entries, wherein a respective vector entry includes a numeric value that characterizes a user behavior for the end-user;
      producing a behavior-encoded message that encodes the end-user's behavior pattern, wherein producing the behavior-encoded message involves using a hash function to encode the user-behavior vector;
      determining that the end-user is eligible to receive the digital coupon in response to detecting a match between the criteria-encoded message and the behavior-encoded message; and
      presenting the digital coupon to the end-user in response to determining that the user is eligible.

18. The apparatus of claim 17, wherein the criteria-encoded message is generated by encoding the behavior-criteria vector using a locality-sensitive hash function; and
   wherein the method further comprises producing the behavior-encoded message by encoding the user-behavior vector using the locality-sensitive hash function.

19. The apparatus of claim 18, wherein determining whether the end-user is eligible to receive the digital coupon involves comparing the behavior-encoded message to the criteria-encoded message.

20. The apparatus of claim 17, wherein the criteria-encoded message is generated using a criteria-encoded key to encode a first secret, and wherein the criteria-encoded key is generated from the behavior-criteria vector; and
   wherein encoding the user-behavior vector comprises:
      generating a behavior-encoded key from the user-behavior vector;
      generating a second secret; and
      encoding the second secret using the behavior-encoded key to produce the behavior-encoded message.

21. The apparatus of claim 20, wherein the method further comprises sending the behavior-encoded message, which encodes the second secret, to a coupon server.

22. The apparatus of claim 20, wherein the method further comprises receiving an encrypted digital coupon; and
   wherein determining whether the end-user is eligible to receive the digital coupon comprises:
      generating a shared key using the criteria-encoded message and the second secret; and
      determining whether the shared key decrypts the encrypted digital coupon.

23. The apparatus of claim 20, wherein the method further comprises decoding the first secret from the criteria-encoded message using the behavior-encoded key.

24. The apparatus of claim 17, wherein the behavior-criteria vector includes one or more numeric entries indicating a behavior criteria, and wherein each entry has a corresponding behavior-detecting function that encodes a behavior pattern of the end-user; and
   wherein generating the user-behavior vector comprises generating a numeric value for an entry of the user-behavior vector using a corresponding behavior-detecting function.

* * * * *